Jan. 16, 1962   W. E. DAVIS   3,016,721
UNIVERSAL JOINT

Filed April 14, 1960   2 Sheets-Sheet 1

WILLIAM E. DAVIS
INVENTOR.

BY John R. Faulkner
   Clifford L. Sadler
ATTORNEYS

Jan. 16, 1962 W. E. DAVIS 3,016,721
UNIVERSAL JOINT

Filed April 14, 1960 2 Sheets-Sheet 2

WILLIAM E. DAVIS
*INVENTOR.*

BY *John R. Faulkner*
*Clifford L. Sadley*

ATTORNEYS

United States Patent Office 3,016,721
Patented Jan. 16, 1962

3,016,721
UNIVERSAL JOINT
William E. Davis, Northville, Mich., assignor to Ford Motor Company, Dearborn, Mich., a corporation of Delaware
Filed Apr. 14, 1960, Ser. No. 22,333
1 Claim. (Cl. 64—21)

The present invention relates to universal joints and more particularly to constant velocity universal joints.

In certain applications where it is necessary to transmit rotating motion from one shaft to another shaft angularly situated relative to the first shaft, conventional universal joints, such as the Cardan joint, are not acceptable. For example, where the angular relationship of the two shafts is great or varies greatly or where a smooth even flow of power is desired as in the drive line of an automobile, a constant velocity universal joint is required. Such a joint maintains the angular velocity of the input member equal to the angular velocity of the output member regardless of the angular relationship of the two members.

Therefore, it is an object of the present invention to provide a constant velocity universal joint which is characterized by its simplicity of construction and economy of manufacture.

More specifically, the present invention provides a universal joint having a ball and socket connection of its driving and driven members and a pair of trunnions associated with the end of each member which complement the interior surface of a spring positioned intermediate member.

These and further objects of the present invention will become more apparent from the following description and the accompanying drawings, in which:

FIGURE 1 is an elevational view partly in section of a universal joint constructed in accordance with this invention.

FIGURE 2 corresponds to FIGURE 1 with the joint partly disassembled.

Figure 1:
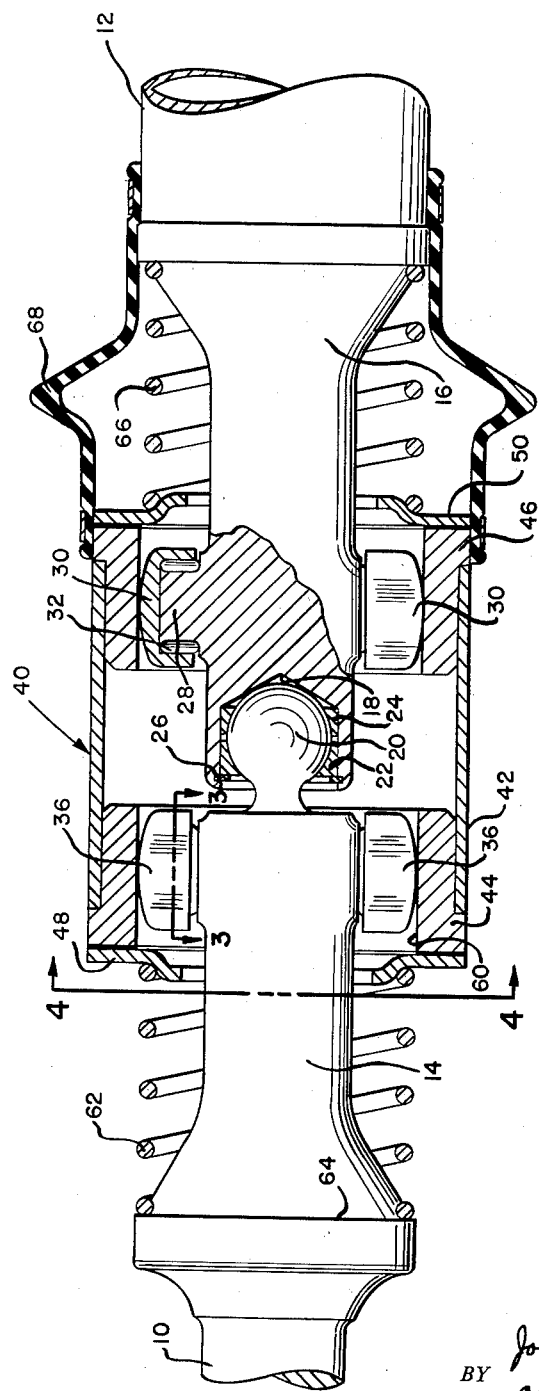

Referring now to the drawings for a more detailed understanding of this invention, FIGURE 1 discloses a constant velocity universal joint which connects a driving shaft 10 with a driven shaft 12.

The joint has an input member 14 which is joined to the driving shaft 10 by welding. Similarly, an output member 16 of the joint is welded to the driven shaft 12. The inner end of the output member 16 is provided with a coaxial bore 18. The inner end of input member 14 is provided with a ball 20 which is received within the bore 18. The ball 20 may be formed as the end of a stud and threaded into the end of the input member 14. A pair of hemispherical socket pieces 22 and 24 provide a bearing for the ball 20 and are positioned within the bore 18 and held in place by a snap ring 26.

The end of the member 16 is provided with a pair of opposed trunnions which carry a pair of trunnion blocks 30. As seen in FIGURE 1 the trunnion of member 16 is shown partly in section and is indicated by the reference numeral 28. Trunnions 28 rotatably support trunnion blocks 30 by means of needle bearings 32. Similarly as seen in FIGURES 1 and 3, the end of input member 14 is provided with trunnions 34 which carry trunnion blocks 36 by means of needle bearings 38.

Figure 3:
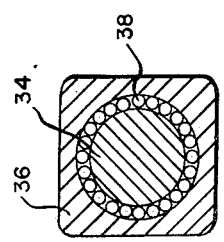
FIGURE 3 is a sectional view taken along section line 3—3 of FIGURE 1.

The trunnion blocks 30, 36 are of generally cap shape having an end surface of hemispherical configuration and flat sides so as to provide a square shape in sectional view (FIGURE 3).

The trunnion blocks 30, 36 are carried within a sleeve assembly 40 which constitutes the torque transmitting medium between the trunnions 34, 36 of the input member 14 and the trunnions 28, 30 of output member 16. The assembly 40 includes a cylindrical piece 42 which holds a bearing member 44 for the input trunnion blocks 36 at one end and a bearing member 46 for the output trunnion blocks 30 at the other end.

A pair of closure plates 48, 50 form the ends of the assembly 40. A series of machine screws 52 secures the closure plates 48 to the bearing member 44. Closure plate 50 is similarly fastened to bearing member 46.

Figure 4:
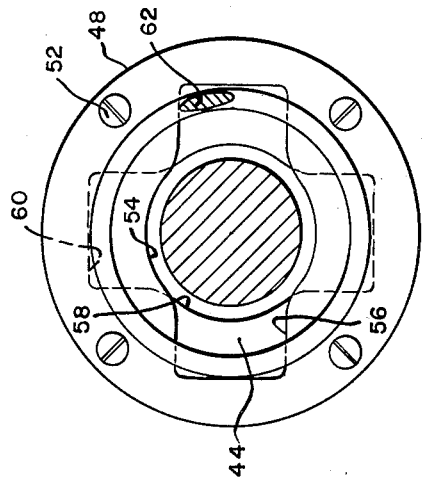
FIGURE 4 is a sectional view taken along lines 4—4 of FIGURE 1.
Figure 2:
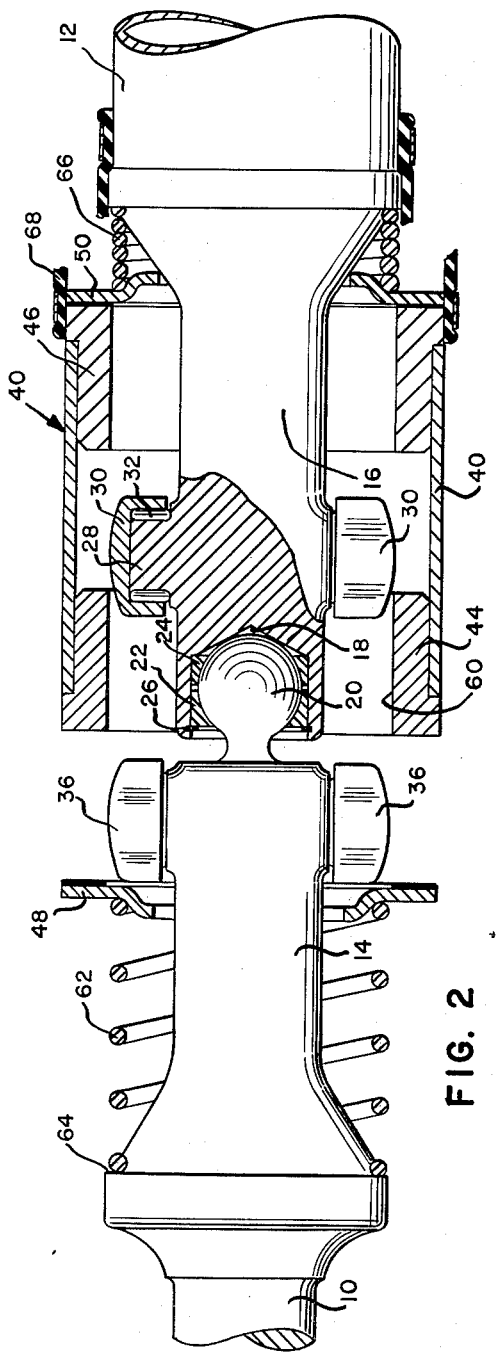

As seen in FIGURE 4, the closure plate 48 is of generally keyhole shape having a central hole 54 and a pair of radially extending cutaway portions 56 which permit the plate 48 to pass over the end of the input member 14 with the trunnion blocks 36 passing through the cutaway portion 56.

As also seen in FIGURE 4, the bearing member 44 is bored out in a fashion similar to the cutout portion of the cover plate 48. That is, it has a central bore 58 and a pair of radially extending grooves or splines 60. The splines 60 receive the trunnion blocks 36.

In assembling the universal joint of FIGURE 1, a spring 62 is passed over the input member 14 until one end rests against a shoulder 64 at the juncture of the input member 14 and the driving shaft 10. The cover plate 48 is then slipped over the end of the input member 14 and turned 90 degrees so that the slots 56 are out of alignment with the trunnion blocks 36. Similarly, a spring 66 is slipped over the end of the output member 16 and cover plate 50 placed in position with its radial slots 90 degrees out of alignment with the trunnion blocks 30. Next the torque transmitting assembly 40 is slipped over the end of the output member 16 so as to force the cover plate 50 to compress the spring 66.

Socket part 24 is placed in the bore 18, the ball 20 is positioned against the socket part 24 and the second socket part 22 is positioned in place by snap ring 26. In the fabrication of this device the ball 20 may be formed as the head of a stud which is threadably received in the end of the input member 14. This construction permits the socket part 22 to be put in place before the stud carrying the ball 20 is threaded into the end of the input member 14.

After the ball and socket ends of the input and output members 14, 16 are secured, the intermediate assembly 40 is released under the pressure of the spring 60 so that it will center with the bearing splines of bearing member 46 in alignment with the trunnion blocks 30 and the bearing splines 60 of bearing member 44 in line with trunnion blocks 36. The cover plates 48 and 50 are then secured by screws to the bearing members 44, 46.

The assembly is then complete and assumes the configuration as disclosed in FIGURE 1. As an additional improvement, a rubber boot 68 may be placed over one or both ends of the universal joints to maintain the bearings 32, 38 free of dust. While only one boot 68 is shown in the drawing for illustrative purposes, it is likely that in actuality a boot will be provided for each end of the joint.

The foregoing description constitutes the preferred embodiment of the present invention and illustrates a simplified constant velocity universal joint. Without the requirement for complex curved surfaces the components of the joint can be manufactured by conventional machine tools. The bearing splines, such as 60, are formed with flat surfaces and are therefore easily manufactured. The two springs 62 and 66 serve to maintain the torque transmitting assembly 40 in a central position. The pairs of trunnions 28 and 34 are positioned uniplanar.

While the present invention has been described in detail, such construction is for the purpose of illustration and not limitation. Modifications may occur to those skilled in the art which will come within the scope and spirit of the appended claim.

I claim:

A constant velocity universal joint having driving and driven members, concentric ball and socket means interconnecting the ends of said driving and driven members, each of said members having at least one pair of opposed radially extending trunnions, said pairs of trunnions being positioned uniplanar, a torque transmitting member interconnecting said pairs of trunnions, said torque transmitting members comprising a pair of bearing members each receiving the trunnions of one of said driving and driven members, said bearing members having an axial keyhole opening corresponding generally to the cross sectional configurations of said driving and driven members at their trunnions, a cylindrical piece joining said bearing members, cover plates closing the open end of said bearing members, said cover plates having an axial opening corresponding to the opening of said bearing members and positioned 90° out of phase therewith, and a pair of springs centering said torque transmitting member, said springs each being interposed between one of said cover plates and one of said driving and driven members.

References Cited in the file of this patent

UNITED STATES PATENTS

| | | |
|---|---|---|
| 2,186,846 | Trbojevich | Jan. 9, 1940 |
| 2,574,226 | Sampson | Nov. 6, 1951 |